United States Patent [19]

Coetsier et al.

[11] 4,370,883

[45] Feb. 1, 1983

[54] METHOD OF MEASURING THE POWER OUTPUT OF AN AUTOMATIVE VEHICLE ENGINE ON A ROLLER TESTING BENCH

[75] Inventors: Paul Coetsier, Chelles; Robert Ravarotto, Villiers sur Marne, both of France

[73] Assignee: Etablissements M. Muller & Cie, Paris, France

[21] Appl. No.: 196,312

[22] Filed: Oct. 14, 1980

[30] Foreign Application Priority Data

Oct. 16, 1979 [FR] France ............................... 79 25662
Aug. 6, 1980 [FR] France ............................... 80 17347

[51] Int. Cl.³ ........................ G01L 5/13; G01M 15/00
[52] U.S. Cl. ................................... 73/117; 73/862.19
[58] Field of Search ........................... 73/117, 862.19

[56] References Cited

U.S. PATENT DOCUMENTS

| | | | |
|---|---|---|---|
| 3,651,690 | 3/1972 | Pagdin et al. | 73/117 |
| 3,657,922 | 4/1972 | Sibeud | 73/117.3 |
| 3,921,446 | 11/1975 | Ludloff | 73/117 X |
| 4,055,996 | 11/1977 | Dinkelacker et al. | 73/117 |

Primary Examiner—Charles A. Ruehl

Attorney, Agent, or Firm—Young & Thompson

[57] ABSTRACT

This method of measuring the power of an automotive vehicle engine on a roller-type testing bench comprises selecting the vehicle velocity and/or the engine speed whereat it is desired to make the measurement; increasing the engine speed during a first acceleration phase up to the selected value, measuring at this value the power available at the wheels, accelerating the engine slightly above the selected value, then disconnecting the drive and engaging the neutral; and allowing the rollers to slow down while they drive the engine transmission by inertia in order to measure, during this second deceleration phase, the power lost in the transmission. An electric signal generator is associated with a testing roller; the period of the signals emitted by the generator is measured as a function of the variation in the rotational speed of the roller by using a quartz clock having a predetermined frequency, whereafter the power is calculated from the measured period and from the moment of inertia of the rollers, and the roller speed is also calculated from the signal period and the roller radius, at predetermined time intervals during the acceleration and deceleration phases.

6 Claims, 7 Drawing Figures

FIG_1

METHOD OF MEASURING THE POWER OUTPUT OF AN AUTOMATIVE VEHICLE ENGINE ON A ROLLER TESTING BENCH

BACKGROUND OF THE INVENTION

The present invention relates in general to a method of measuring the power output of an automotive vehicle engine on a roller-type testing bench.

DESCRIPTION OF THE PRIOR ART

It is already known to measure the power output of a vehicle engine on a roller-type testing bench, by applying the method consisting in causing the drive wheels of the vehicle to bear on two pairs of rollers, selecting a speed or number of r.p.m. of the engine whereat the measure is to be made, increasing the engine speed during a first acceleration phase up to the preselected value, measuring at said preselected speed the power available at the drive wheels, accelerating the engine slightly above this speed, and then disengaging the clutch or the drive and changing to neutral, allowing the velocity of rotation of the rollers to decrease until they cease to rotate while driving by their inertia the engine transmission. During this second deceleration phase, the power lost in the transmission is measured.

This method, in which the engine power and the velocity of rotation of the rollers are determined by an analog process, as the speed varies, is already known through the French Patent Application Ser. No. 76 27, 352 published under the 2, 323,996. The diagram obtained at the end of a measurement cycle plots in ordinates the engine power rating and in abscissae the engine speed. During the acceleration phase, the power recorded in the diagram is the power actually transmitted from the engine to the drive wheels, and this curve displays sudden changes corresponding to the changes of gear ratio. When the engine is disconnected from the drive, the power thus recorded suddenly drops to a negative value and then approaches zero as the velocity of rotation of the rollers decreases, the rollers driving the transmission by inertia.

The power recorded for a given speed displayed in negative ordinates is due to transmission losses, the total power output of the engine being therefore equal, in absolute value, to the power measured at the drive wheels plus the corresponding power fraction lost in the transmission.

According to the measurement method disclosed in the abovementioned patent, the frequency for each speed value is calculated by means of a rotational speed pick-up device or sensor provided on a measuring roller of the testing bench, this pick-up delivering an output signal proportional to the rotational speed of the roller. The signal thus generated is then processed in an analog device giving a product of the signal corresponding to the velocity of rotation by another signal depending on the torque, so that the power output value can be obtained.

Moreover, this calculation is made by taking into account a correcting value introduced by the operator into the device, and includes several correcting factors concerning the particular type of vehicle being tested on the bench, the atmospheric pressure resulting notably from the site where the measurement takes place, and the room temperature. These various correcting factors may be introduced into the circuit by using an adjustable voltage divider.

Thus, before each power output measurement or before each series of measurements contemplated, the operator introduces manually into the device correcting values taking due account of several parameters, of which some relate to the vehicle characteristics, and eventually a value of the properly corrected power output is obtained.

The degree of precision attained by using the frequency measurement method varies as a function of the value of the frequency itself, which may vary in a ratio of 1 to 10 when the rollers are rotated by the drive wheels at a speed corresponding for instance to 20 km.p.h. to 200 km.p.h.. This lack of precision observed in the frequency measurement method entails a correlative lack of precision in the power output measurement. Moreover, the analog processing of the signals leads to the tracing of a power output curve the precision of which depends on the width of the processing integration intervals.

SUMMARY OF THE INVENTION

It is the primary object of the present invention to provide a method of measuring the power output of a vehicle engine, which permits of determining the engine power output with an increased precision in comparison with hitherto known methods.

In the method of this invention, a signal generator is fastened to a measuring roller, and the period of the electric signals emitted by the generator as a function of the variation in the roller rotational speed is measured by means of a quartz clock at a predetermined frequency; then the power output is calculated from the measured period and the moment of inertia of the rollers, and the roller speed is also calculated from the aforesaid period and the roller radius, these power and speed calculations being made at predetermined time intervals during the acceleration and deceleration phases.

Assuming that the period is the time elapsing between two electric signals delivered by the generator fitted to the roller while this roller accomplishes a complete revolution, this period will vary of course as a function of the velocity of rotation of the rollers and of the corresponding number of revolutions of the engine. At the same time, the quartz clock set at a suitable frequency emits pulses the totalization of which between two successive electric signals permits of measuring the period with a precision remaining constantly equal to that of said clock, irrespective of the period amplitude.

It is obvious that the very high degree of precision achieved in the measurement during the period by virtue of the clock, set for emitting high-frequency pulses, permits of measuring the period with a high and constant precision, irrespective of the period amplitude. Thus, the power calculated from the various period values will be obtained with a correlatively greater precision in comparison with the method based on the frequency measurement.

According to a specific form of embodiment of the invention, a suitably programmed microprocessor is used for calculating the engine power output in time intervals defined by two successive signals emitted by the signal generator which emits a signal at each complete revolution performed by the corresponding measuring roller.

According to a major feature characterizing the method of this invention, for each predetermined and displayed vehicle velocity or number of engine r.p.m.

selected for making the measurement, the engine power output obtained at the drive wheels at said velocity, the power lost at said velocity in the transmission, the total engine power output (i.e. the sum in absolute value of the two power values just mentioned), and the percentage of power lost in relation to the total power, are recorded by a printer.

Thus, the desired data are made automatically available in printed form for the operator at the end of each measurement cycle.

The testing bench for measuring the power output of an automotive vehicle engine, according to the method of this invention, comprises:

a velocity pick-up associated with a measurement roller, which comprises an electric-signal generator capable of emitting a signal at each complete revolution of the measurement roller;

a microprocessor connected on the one hand to the velocity pick-up and on the other hand to means for converting and recording the power measured at the drive wheels of the vehicle and the velocity during the acceleration phase, as well as the power lost on account of the transmission inertia during the deceleration phase, the power and speed values being recorded respectively in ordinates and abscissae on a tracing board, said microprocessor being capable of calculating the power for each speed value from the calculated time period in a logic processing interface interposed between said velocity pick-up and said microprocessor.

According to a preferred form of embodiment of the method of this invention, the power is calculated by applying an integration rate either fixed or variable, as a function of the shape of the power curve. This integration of the power values thus obtained is accomplished by the computer during several periods, so that a more regular curve can be traced and a number of irregularities observed on the curve between two successive gear changes, due to the vibration resulting from a poor wheel balance or to other dynamic troubles, can be removed, these irregularities being a source of errors.

Other features and advantages of this invention will appear as the following description proceeds with reference to the accompanying drawings.

DETAILED DESCRIPTION OF THE INVENTION

The method of measuring the power of an automotive vehicle engine on a roller testing bench according to the present invention is based on the application of the following formula:

$$P = J\omega \frac{d\omega}{dt}$$

wherein P is the engine power in kW, J the moment of inertia of the rollers in kg/sq.m.; and $\omega$ the angular velocity of the rollers in rd/s.

For a sufficiently small $\Delta t$, the formula becomes:

$$P = J\omega \frac{\Delta \omega}{\Delta t}$$

In the above formula: $\Delta t$ is the time required for a roller to perform a complete revolution. If the power P had to be calculated directly from this formula; this would require the measurement of the angular speed $\omega$, and therefore of the frequency.

To permit the calculation of the power from the period (T) or $\Delta t$, and to limit the calculation time as well as the length of the corresponding program, the preceding formula is converted as follows:

$$P = J\omega \frac{\Delta \omega}{\Delta t} \text{ Hence } P = J\omega \frac{\omega 2 - \omega 1}{\Delta t}$$

wherein $\omega 1$ and $\omega 2$ are two values of $\omega$ measured successively after a time $\Delta t$.

Now since $$\omega = \frac{2\pi}{T} \text{ we have } P = \frac{2\pi J}{T} \times \frac{\frac{2\pi}{T_2} - \frac{2\pi}{T_1}}{\Delta t}$$

Since $\Delta t$ differs slightly from T, one can write:

$$P = \frac{4\pi^2 J (T_1 - T_2)}{T^2 \cdot T_1 \cdot T_2}$$

Considering that the measurement is made on two successive signals, the values of T are very close to each other and thus one may also write:

$$P = \frac{K_1 J (T_1 - T_2)}{T^4}$$

in which P is expressed in kW, J in kg/sq.m. and $K_1 = 4.10^{18} \times \pi^2$

The speed is also calculated from T:

$$V = \frac{K_2 \cdot R}{T}$$

wherein V=km.p.hr., R=meters (roller radius), $T = 10^{-7}$s and $K_2 = 72. 10^6. \pi$.

Now reference will be made to FIG. 1 of the attached drawing for describing a typical form of embodiment of the testing bench of this invention for determining the power output of an engine according to the calculations set forth hereinabove.

This testing bench comprises two pairs of rollers adapted to receive the drive wheels of the vehicle to be tested, one roller of each pair (1, 2) being provided with a speed pick-up device or sensor 3, 4, respectively. These pick-up devices consist of electric signal generators capable of emitting a signal, in a manner known per se, for each complete revolution accomplished by the corresponding measuring roller 1, 2.

The testing bench equipment comprises on the other hand a microprocessor or micro-computer 5 coupled on the one hand to the pair of speed pick-ups 3, 4 via a shaper 6 and an input interface 7, and on the other hand to converters 8, 9 and to means for recording the power available at the wheels, the power absorbed by the transmission, and the vehicle speed.

The converters 8, 9 are thus adapted to convert the values of speed in km.p.hr. delivered by the microprocessor 5, and of power, for example in H.P., also calculated by the microprocessor, respectively. A tracing table 11 coupled to converters 8, 9 is provided for recording the evolution of power P along the y-axis, the speed V being recorded on the abscissa axis (see FIG. 3).

A screen 12 connected to the microprocessor 5 is provided for displaying, for the vehicle speed or engine r.p.m. preselected for measuring the power output, the power available at the drive wheels, for example in kW, and the power available at the drive wheels but expressed in H.P. This screen 12 may also be used for displaying continuously the velocity in km.p.hr. of the vehicle. Another screen 13 is provided for displaying the total engine power output measured at the preselected velocity (or r.p.m.), in kW or H.P. With this complementary screen 13 it is also possible to display continuously the number of r.p.m. of the vehicle engine.

Figure 1:
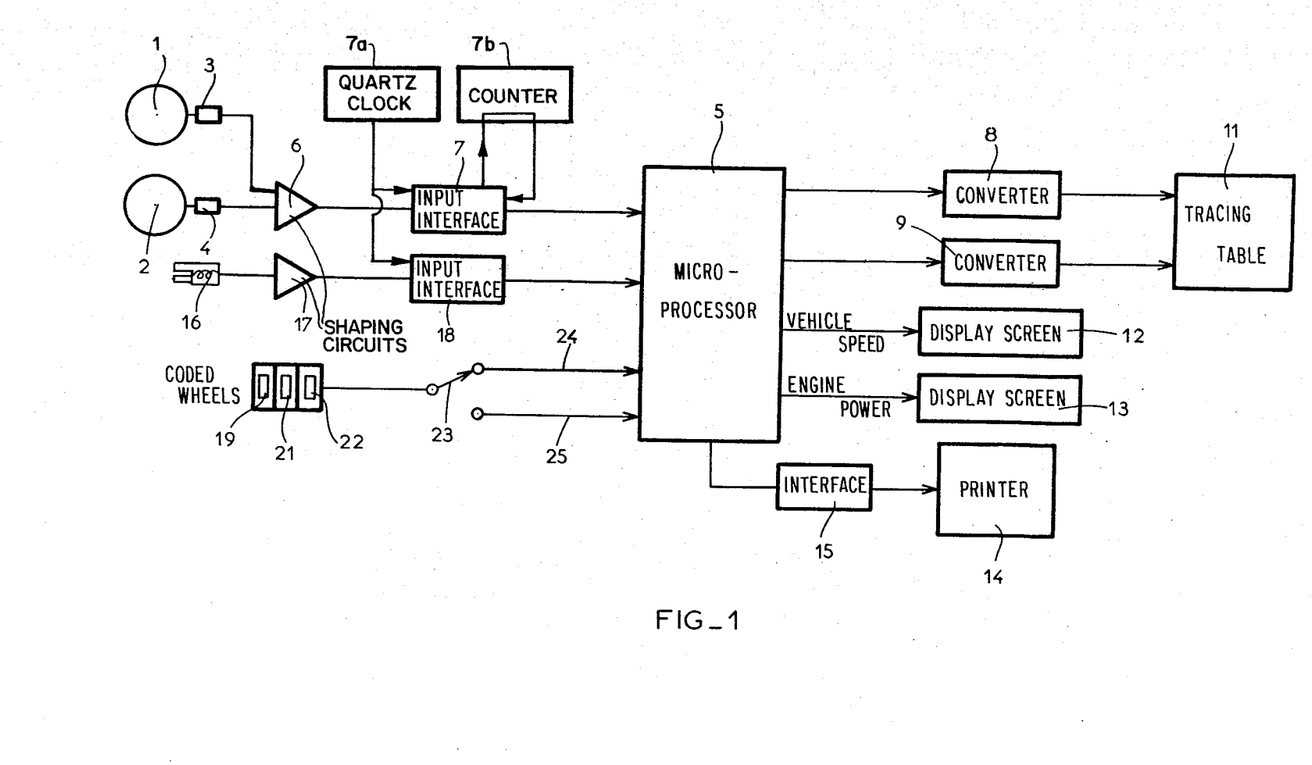
FIG. 1 is a block diagram of a typical form of embodiment of the electronic system associated with the testing bench according to this invention.

According to a particularly interesting feature of this invention, the electronic equipment shown diagrammatically in block form in FIG. 1 further comprises a printer 14 coupled to microprocessor 5 via an interface 15 and adapted to display, for example, the following data:

| | |
|---|---|
| Vehicle Speed | km.p.hr. |
| Engine rotational velocity | r.p.m. |
| Engine power output | H.P. |
| Power available at the wheels | H.P. |
| Power absorption or loss | % |

These data are thus available for the operator at the end of the measurement cycle for the preselected speed.

The electronic equipment associated with the testing bench of this invention comprises in addition an inductive clip 16 adapted to be connected in the known fashion to a spark plug of the vehicle engine. This clip 16 is also coupled to a shaping circuit 17 connected in turn to an input interface 18 leading to the microprocessor 5.

The testing bench is also provided with three coded wheels (19, 21, 22) bearing each ten numerals, from 0 to 9, for manually preselecting either the vehicle velocity in km.p.hr. or the engine number of r.p.m. at which the measurement is to be carried out. A switch 23 is provided for selecting either the vehicle speed or the engine r.p.m. value, via connections 24, 25 connecting the switch 23 to microprocessor 5, respectively.

The measurement method according to the present invention by means of the testing bench shown diagrammatically in FIG. 1 is carried out as follows:

Firstly, the vehicle velocity in km.p.hr. or the engine r.p.m. value at which it is desired to make the measurements is selected by means of the preselection coded wheels 19, 21, 22. The corresponding data (velocity in km.p.hr. or r.p.m.) is thus stored in the memory of microprocessor 5.

Then, the operator starts the vehicle and accelerates it gradually up to the preselected and displayed velocity, for example 150 km.p.hr. Beyond a speed threshold corresponding to a predetermined number of revolutions of the measuring rollers 1, 2, for example ten km.p.hr., the speed pick-ups 3, 4 deliver to the input interface 7, via shaper 6, electric signals at each complete revolution accomplished by the rollers 1, 2, the shaper 6 providing the average of the signals delivered by pick-ups 3 and 4. On the other hand, a quartz clock 7a of, say, 10 Mhz, constantly emits pulses at this frequency. As already mentioned in the foregoing, the period, that is, the time elapsing between two successive signals emitted by the speed pick-ups 3, 4, is calculated by the interface 7 in the form of a wired logic circuit.

The measurement is accomplished on three successive signals forming together two successive gaps of which the duration discrepancy is inversely proportional to the value of $\Delta\omega$.

The access into interface 7 of a signal generated by the speed pick-up, or rather the signal constituting the average of the signals received from pick-ups 3 and 4, is attended in succession, in said interface 7, by the storage of the number of pulses emitted by the clock between this signal and the preceding signal, the resetting of a counter 7b adding the pulses from said clock, and the delivery of a measurement termination signal to microprocessor 5.

By way of illustration, the period may be calculated by the interface 7 about every 0.5 second.

The second interface 18 controls the engine rotational speed.

Upon receipt of the measurement termination signals, the microprocessor 5 disposes as a calculation basis of a value of period T having an accuracy of $10^{-7}$ s $\pm 1$ bit. This value is stored in the memory of microprocessor 5 on six digits of four bits each, thus permitting the measurement of a maximum period of $(2^{24}-1)\cdot 10^{-7}$ s, that is, $16.777.215\cdot 10^{-7}$s, or 1.67 seconds. In case the measurement rollers 1, 2 had a circumference of one meter, the above-mentioned maximum period of 1.67 seconds would correspond to a velocity of 2.15 km.p.hr. which is amply sufficient for beginning the measurement.

The period T decreases gradually as the roller speed increases, and the microprocessor 5 calculates the power and speed from the successive values of the period delivered thereto by the interface 7. Each measurement is made preferably on three successive signals received from pick-ups 3, 4, as already explained hereinabove. Therefore, to each value of the power thus calculated at time intervals depending on the velocity at which the microprocessor 5 makes the calculation, there corresponds a point having predetermined ordinate and abscissa, which is written on the tracing board 11 after the data supplied by the microprocessor have been converted by the converters 8, 9.

It may be pointed out that the microprocessor 5 is so programmed that it acquires the measurement threshold before performing a power calculation. After each acquisition of said threshold, which corresponds for example to a minimum speed of 10 km.p.hr. below which the power is not calculated, the microprocessor 5 waits for the measurement termination signal delivered by the period-measuring interface 7. On receipt of this measurement termination signal, the microprocessor 5 acquires the period delivered by the interface and compares same with a predetermined value corresponding to the aforementioned speed threshold. If the period is greater than this value, the program is looped again and repeats the threshold acquisition. Otherwise, the power and velocity calculation process is injected into the processing unit of the microprocessor.

During each program, for example about every 0.5 second, the microprocessor 5 determines the vehicle velocity, the power applied to the measurement roller and the engine rotational speed, according to the data delivered by the interface 18 coupled to the inductive clip 16. The microprocessor controls the tracing board 11 by writing thereon the vehicle speed along the x-axis and the power output along the y-axis. When the speed is equal to the preselected speed at which it is desired to make the measurement, for example 150 km.p.hr., the corresponding power value is stored in the memory (this power value being the power applied to the wheel). Then the method proceeds through the following steps. The acceleration is maintained until the engine rotates at a speed slightly higher than the displayed speed, say a few percent higher, for example 155 km.p.hr. if the selected speed was 150 km.p.hr. At that time, a red light is turned on in the control board, whereafter the operator releases the accelerator pedal and engages the neutral. The vehicle speed decreases, and when it is again equal to the value selected for the measurement, the power value is again memorized. This value is a negative one, for it corresponds to the deceleration phase during which the tracing board 11 records the power absorbed by inertia by the transmission mechanism.

The rollers 1, 2 are allowed to slow down gradually while driving the engine transmission, the tracing board recording the corresponding absorbed power in negative values.

Summing in absolute value the power measured at the wheels and the absorbed power will give the total power developed by the engine at the predetermined measurement speed at the beginning of the cycle.

When the roller speed has fallen to a value below the minimum threshold value, for instance 10 km.p.hr., the results can be displayed either in H.P. or in kW on display members 12 and 13, by actuating suitable switch means. On the other hand, the printer 14 delivers data concerning the engine power output at the selected measurement speed. A typical example of the data received and displayed by the printer 14 is illustrated in FIG. 3; it will be seen that the measurement took place at a vehicle speed of 130 km.p.hr., the engine rotational speed being 5,540 r.p.m., corresponding to a total power output of 88 H.P., a wheel power of 67 H.P. and an absorbed power fraction of 23%.

Figures 2, 3:
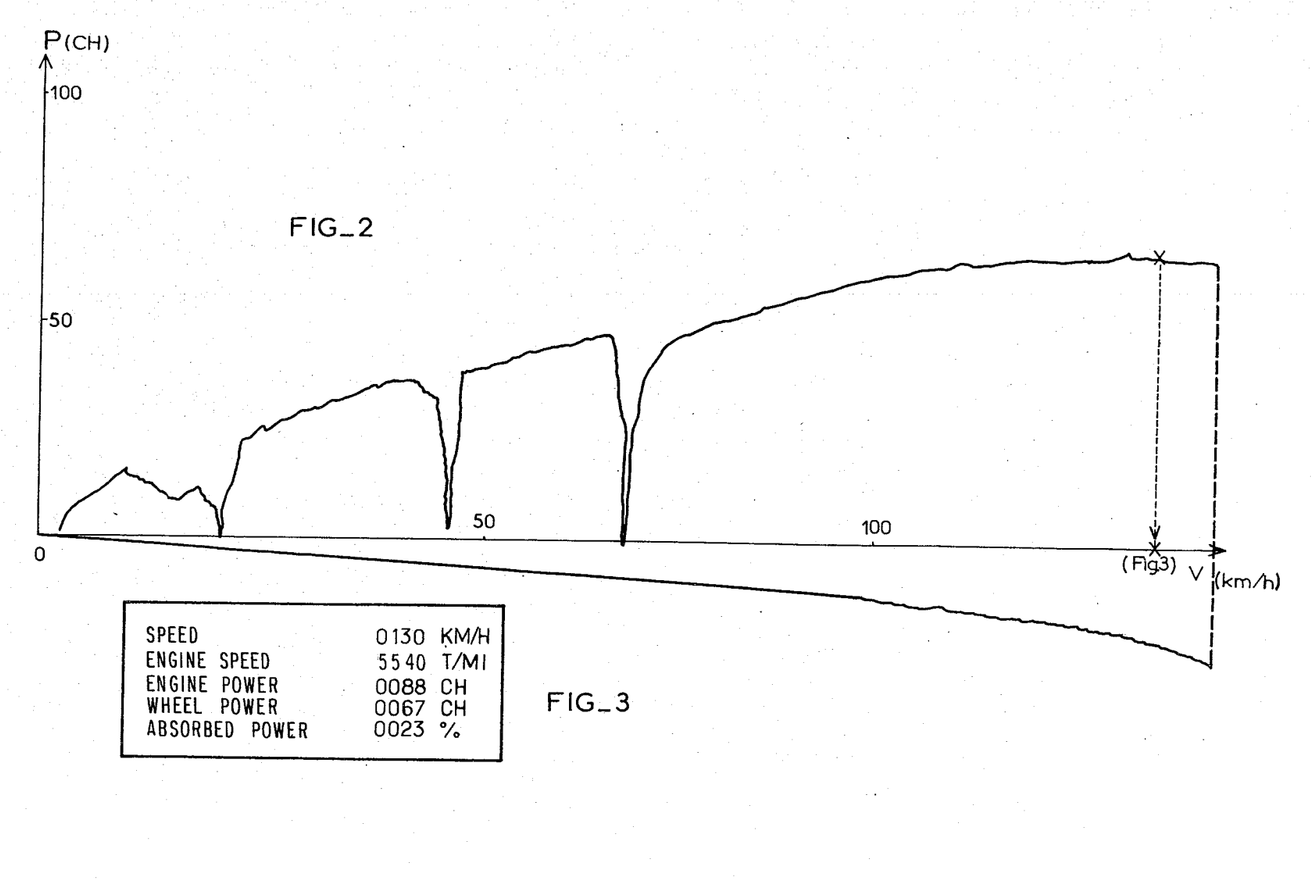
FIG. 2 is a first example of a diagram plotting the power as a function of speed, obtained by means of the testing bench of this invention.
FIG. 3 is a numerical example of the data which can be recorded by the testing bench printer.

FIG. 2 illustrates a typical example of a curve plotting the power as a function of speed, as recorded by the tracing board 11, this curve corresponding to the numerical example of FIG. 3.

In fact, it will be seen that given a vehicle speed of 130 km.p.hr., the power P measured at the wheel is 67 H.P.

Since the engine power output is determined by a logic process circuit, the higher the velocity of calculation of microprocessor 5, the greater the degree of precision of the resulting values, since the points of the power curve will be correlatively closer to each other. Therefore, if desired the measurements precision may be increased considerably by using a computer capable of achieving the calculation every tenth of second, or every hundredth of second. It is also possible, by using a computer capable of making measurements about every half-second, to couple this computer with a quick-calculus unit or modulus capable of multiplying by ten the calculation speed of the computer. By way of example, a microcomputer of the type known under the reference symbols AM 9511 and 8085 INTEL may be used for this purpose.

Thus, the final precision obtained depends on the one hand on the precision of the period measurement and on the other hand on the capacity of the microprocessor implemented. It will be seen that the precision of the period measurement is completely independent of the period amplitude, since it corresponds to the time period elapsing between two successive pulses of the clock, i.e. $10^{-7}$ seconds in the example described herein, irrespective of the amplitude of the measured period. By way of indication, the number of pulses emitted by the clock in a period corresponding to a vehicle velocity of about 100 km.p.hr., with a 120-kW power output, is of the order of 5,000.

In a second form of embodiment of the method contemplated in the present invention, the power is calculated with an integration rate which in either fixed or variable as a function of the shape of the power curve.

Figure 4:
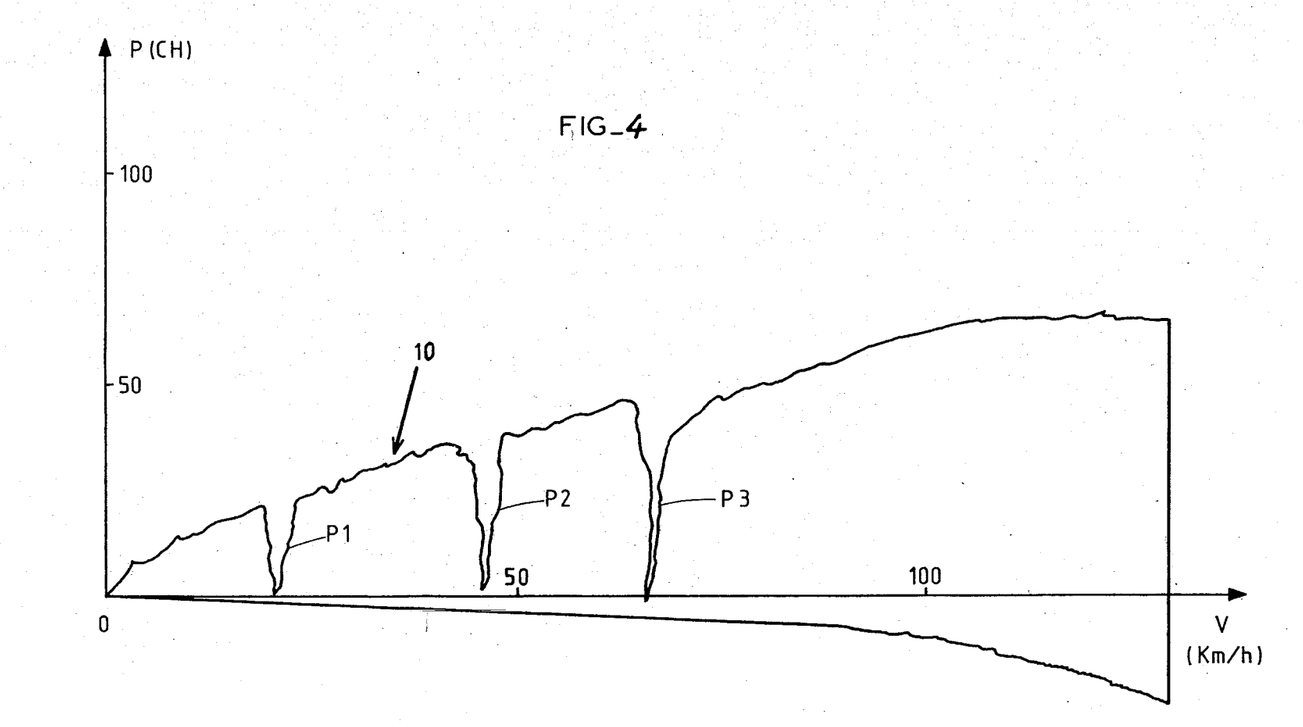
FIG. 4 is a diagram plotting the power as a function of speed, which is similar to that of FIG. 2.

In fact, when the power curve P (in horse power) as a function of velocity (in km.p.hr.) illustrated in FIG. 4 reaches a maximum value between two successive gear changes, irregularities are observed, notably in section 10 of this curve, in the form of small waves denoting defects due to vibration. Integrating the power values obtained during several periods will eliminate these defects observed in the recorded curve, as clearly shown in the curve P/V of FIG. 5.

Figure 5:
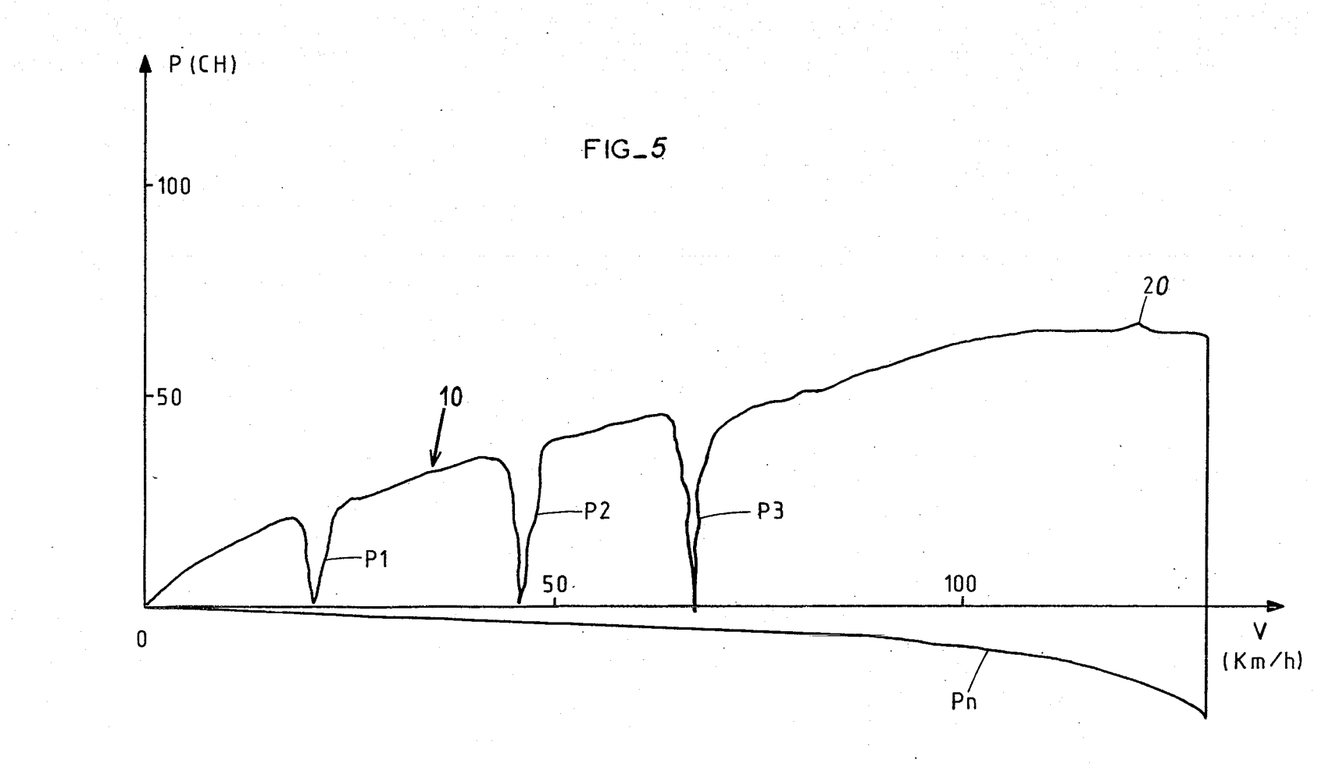
FIG. 5 is a diagram showing the same curve as FIG. 4 but wherein the power calculation has been integrated according to a variable rate as a function of the curve slope, according to a second form of embodiment of the method of this invention.

In this FIG. 5 in fact it is obvious that the successive maximum values of the curve between two gear changes, as shown by the negative peaks p1, p2, p3, are free of the irregularities visible in FIG. 4 and therefore have a nearly regular appearance.

In the form of embodiment of the method, which is illustrated in FIG. 5, the integration rate is modified as a function of the slope of the P/V curve, the integration rate increasing as the curve slope approaches zero.

According to a specific feature characterizing the method of this invention, the integration rate is limited voluntarily to predetermined numerical values in order to display on the power curve any faulty engine operation, such as ignition and/or fuel-vaporization or carburation system failures.

The following possible values are given by way of numerical example but not of limitation.

Assuming that the value of the derivative ($K\Delta V/\Delta P$) is less than 2, the integration rate will remain equal to 1;
If $2 \leq (K\Delta V/\Delta P) < 3$, the integration rate is equal to 2;
If $3 \leq K\Delta V/\Delta P < 4$, the integration rate is equal to 3;
and so forth until $K\Delta V/\Delta P \geq 14$.

For these values the integration rate remains equal to 14; of course, this number is given by way of indication, since any other integer may be used in lieu thereof.

It will be seen that by virtue of this calculation mode, the curve integration improves as the slope approaches zero (FIG. 5). In the end section of the curve of FIG. 5 there is a small irregularity 20 which remains visible notwithstanding this integration and corresponds to an ignition failure. It may be noted that no account is taken of the values (K$\Delta$V/$\Delta$P) which are below zero, in order to avoid aberrations, since the integration rate cannot decrease.

According to another feature characterizing the method of this invention, the calculation of the negative portion $P_n$ of the power curve P corresponding to the power lost in the vehicle transmission is also integrated in the calculation in order to obtain a curve as close as possible to reality.

In the form of embodiment of the method which is illustrated in FIG. 5, the integration was started when the engine began to operate, i.e. from the zero point of the curve. According to another possible form of embodiment, the vehicle speed or engine r.p.m. value at which the calculation of the power output with a variable integration rate begins is preselected.

On this side of this speed or r.p.m. value, the integration is limited to a low, predetermined value, which may be equal to 1, as explained hereinafter.

Figure 6:
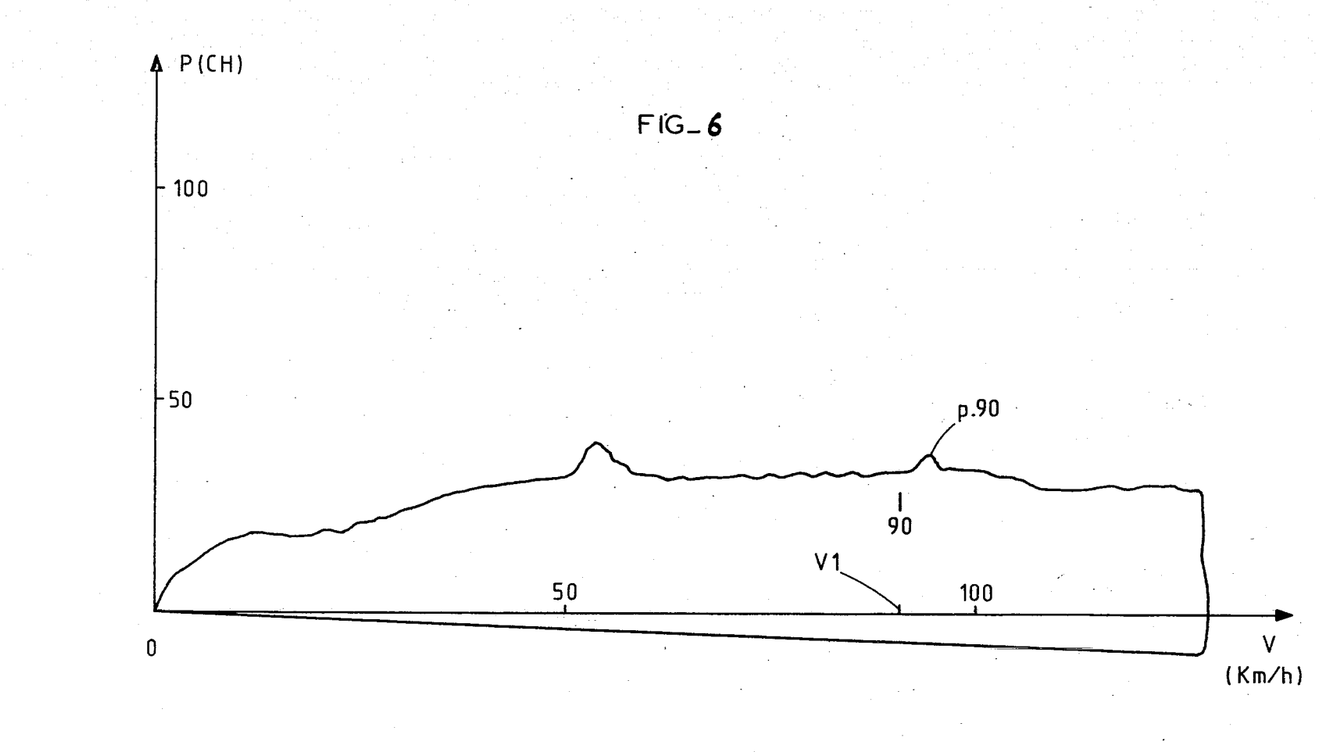
FIG. 6 is another diagram plotting the power as a function of speed for a vehicle equipped with an automatic change-speed transmission, with means for preselecting the change from second to third gear and a minimum integration rate.
Figure 7:
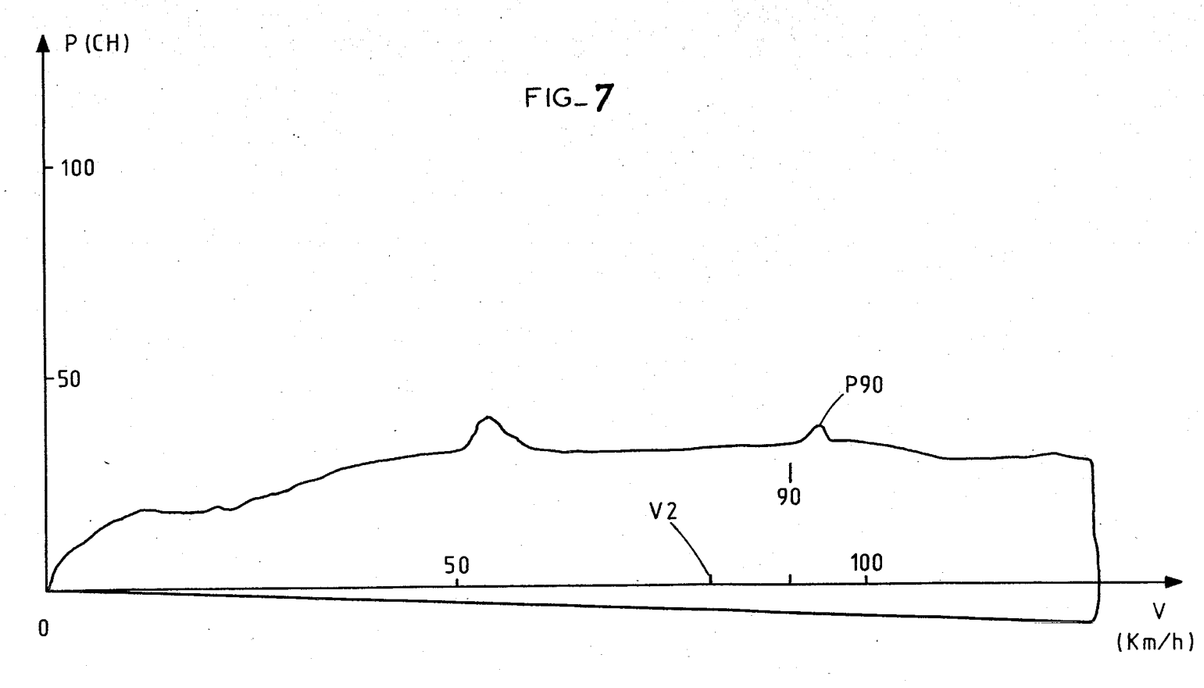
FIG. 7 is a view similar to FIG. 6 but wherein the power calculation integration with a variable rate is initiated before attaining the velocity selected for changing from second to third gear, according to a third form of embodiment of the method of the invention.

Thus, the power diagram of FIG. 6 illustrates the variation in the power measured at the drive wheels of an automotive vehicle equipped with an automatic change-gear or transmission mechanism, and it is assumed that the operator has so preselected the change from intermediate to top gear in this example that it will take place at 90 km.p.hr. (V1 in FIG. 6). The power P is calculated with a variable integration rate from, say, a given velocity value, for instance $V_2 < V_1$ (FIG. 7). A comparison between the curve portions disposed on either side of velocity $V_1$ (FIGS. 6 and 7) will show that the irregularities observed in the curve of FIG. 6 on either side of peak p90 (corresponding to the gear change) have disappeared from the corresponding portion of the curve of FIG. 7, due to the integration thus accomplished.

Under these conditions, when in an automotive vehicle equipped with an automatic transmission mechanism the change from second to third gear occurs at 90 km.p.hr., the operator may either select this speed by means of a coded wheel coupled to the microprocessor, so that the gradual integration cannot start until this speed is reached, or select a speed lower than the change-gear speed, for example 80 km.p.hr. in the example illustrated in FIG. 7 ($V_2$).

This enables the user to study more accurately the passage through the selected speed, since at that time the integration rate has its minimum value (FIG. 6).

It will be seen that it may be advantageous, in the example concerning the change from second to third gear at 90 km.p.hr., to select by means of the coded wheel a speed slightly inferior to 90 km.p.hr. in the example illustrated in FIG. 7. In fact, due to the progressive integration rate, the stray phenomena visible in FIG. 6 are damped out and one can still observe efficiently the change from one gear to another, the peak p90 remaining in fact clearly visible in FIG. 7, notwithstanding a slight damping thereof.

Therefore, it may be advantageous to preselect a speed slightly inferior to the velocity at which the defect or phenomenon to be studied takes place, for example a gear change, a sudden change in the engine speed in r.p.m. carburettor faults, a faulty ignition, etc...

However, it will be readily understood by those conversant with the art that the method of this invention should not be construed as being strictly limited by the three specific forms of embodiment described hereinabove, since many modifications and variations may be brought thereto without departing from the basic principles of the invention.

More particularly, stress may be laid on the fact that, due to the logic processing mode contemplated according to this invention, it is possible to preselect a series of vehicle speeds or numbers of revolutions per minute of the engine whereat it is desired to make measurements, for example every ten km.p.hr from 80 to 150 km.p.hr. The printer 14 will then record, as the values stored in the microprocessor memory are attained, the values concerning the power at the drive wheels, the total power output, the power fraction lost in the transmission, and the percentage of losses for all the preselected velocities. Now this is not possible by using the analog process as when applying the prior art method mentioned in the foregoing, in which only one speed value can be selected.

The parameter selected for integrating the power calculation with a variable rate may differ from the power curve slope; thus, this parameter may consist for example of time, velocity, speed variations, power, the engine speed in r.p.m., the engine speed variations etc. It should be emphasized that due to the voluntary limitation of the integration rate to predetermined numerical values it is possible to display and detect the engine faults on the power curve.

Finally, though the above-described forms of invention of the method utilize a variable integration rate, the latter may as well be fixed either throughout the power curve or along the section of this curve where the power calculation integration takes place.

What is claimed as new is:

1. In a method of measuring the power output of an automotive vehicle engine on a roller-type testing bench, in which the vehicle velocity and/or a number of revolutions per minute of the engine thereof at which it is desired to make the measurement are selected, the engine rotational velocity is accelerated during a first acceleration phase up to the selected value from which the power delivered to the drive wheels is measured, the engine is subsequently slightly accelerated beyond said selected velocity, whereafter the drive is disengaged and the transmission mechanism set to neutral, and the rotation of the bench rollers is allowed to slow down until the rollers come to a standstill while they drive the engine transmission by inertia, in order to measure during this second deceleration phase the power lost in the transmission; the improvement wherein a signal generator is fitted to a measuring roller of said testing bench, the period of the electric signals emitted from said generator is measured, as a function of the variation in the rotational velocity of the roller, by means of a quartz clock at a predetermined frequency, whereafter the power is calculated from the measured period and from the moment of inertia of the rollers, and the roller velocity is also calculated from the aforesaid period and the roller radius, said power and roller velocity being determined at predetermined time intervals during the acceleration and deceleration phases.

2. The method of claim 1, applied to an automatic change-speed mechanism, wherein the testing bench is equipped with a coded wheel whereby the velocity at which the change from one gear ratio to another is to take place can be selected.

3. In a method of measuring the power output of an automotive vehicle engine on a roller-type testing bench, in which the vehicle velocity and/or a number of revolutions per minute of the engine thereof at which it is desired to make the measurement are selected, the engine rotational velocity is accelerated during a first acceleration phase up to the selected value from which the power delivered to the drive wheels is measured, the engine is subsequently slightly accelerated beyond said selected velocity, whereafter the drive is disengaged and the transmission mechanism set to neutral, and the rotation of the bench rollers is allowed to slow down until the rollers come to a standstill while they drive the engine transmission by inertia, in order to measure during this second deceleration phase the power lost in the transmission; the improvement wherein a signal generator is fitted to a measuring roller of said testing bench, the period of the electric signals emitted from said generator is measured, as a function of the variation in the rotational velocity of the roller, by means of a quartz clock at a predetermined frequency, whereafter the power is calculated from the measured period and from the moment of inertia of the rollers, and the roller velocity is also calculated from the aforesaid period and the roller radius, said power and roller velocity being determined at predetermined time intervals during the acceleration and deceleration phases, and using a programmed microprocessor for calculating the engine power output and the roller revolution per minute in time periods defined by two successive signals from said signal generator emitting a signal at each complete revolution accomplished by the corresponding measurement roller.

4. The method of claim 3, wherein a printer is associated with said microprocessor for memorizing each selected velocity or number of revolutions per minute, the engine power output measured at the drive wheels at said velocity, the power lost in the transmission at said velocity, the total engine power output, i.e. the sum in absolute value of the two aforesaid power values, the percentage of absorbed power and the engine rotational velocity.

5. The method of claim 4, wherein between two successive signals emitted by said signal generator associated with said measurement roller, a counter of an interface is provided for totalizing the pulses emitted from said clock, the ingress into said interface of the signal emitted from said generator acting as a speed pick-up device being attended successively by the memorization of the number of pulses, by the resetting of the counter and by the emission of a measurement termination signal directed to said microprocessor.

6. The method of claim 5, wherein the power measured at the drive wheels of the vehicle, as well as the power lost in the transmission and the percentage of power losses at a plurality of predetermined velocities are recorded by said printer.

* * * * *